(12) United States Patent
Flynn et al.

(10) Patent No.: US 9,904,063 B2
(45) Date of Patent: Feb. 27, 2018

(54) COLLIMATING DISPLAY AND METHODS (71) Applicant: Innerscene, Inc., San Francisco, CA (US)

(72) Inventors: Sean Flynn, Gloucester (GB); Jonathan Clark, San Francisco, CA (US)

(73) Assignee: INNERSCENE, INC., San Francisco, CA (US)

(*) Notice: Subject to any disclaimer, the term of this patent is extended or adjusted under 35 U.S.C. 154(b) by 0 days.

(21) Appl. No.: 14/739,087

(22) Filed: Jun. 15, 2015

(65) Prior Publication Data
US 2016/0363777 A1 Dec. 15, 2016

(51) Int. Cl.
*G02B 27/22* (2006.01)
*G02B 27/24* (2006.01)
*G02B 27/14* (2006.01)
*G02B 27/28* (2006.01)
*G02B 27/30* (2006.01)
*F21V 8/00* (2006.01)

(52) U.S. Cl.
CPC ......... *G02B 27/2214* (2013.01); *G02B 6/003* (2013.01); *G02B 27/146* (2013.01); *G02B 27/283* (2013.01); *G02B 27/30* (2013.01)

(58) Field of Classification Search
CPC ........ G02B 27/2214; G02B 2027/0134; G02B 27/0172; G02B 3/005; G02B 27/123; G02B 27/2242; G02B 3/0062; G02B 5/124; G02B 6/00; G02B 6/34; G02B 6/0021; G02B 6/0035; G02B 6/0036; G02B 6/0041; G02B 6/0043; G02B 6/0055; G02B 27/146; G02B 27/283; G02B 27/30; G02B 6/003

USPC ....... 359/463, 466, 471, 477, 475, 454, 455, 359/458, 459, 639, 640
See application file for complete search history.

(56) References Cited

U.S. PATENT DOCUMENTS

| | | | | |
|---|---|---|---|---|
| 6,805,490 B2* | 10/2004 | Levola | ................. | G02B 5/1866 359/13 |
| 7,457,040 B2* | 11/2008 | Amitai | ................. | G02B 6/0018 345/7 |
| 8,068,285 B1 | 11/2011 | Flynn | | |
| 2013/0250431 A1* | 9/2013 | Robbins | ............. | G02B 27/0172 359/633 |

OTHER PUBLICATIONS

Wavelength Opto-Electronic News Release—Lateral Displacement Polarization Beamsplitter, 2012, 1 page, accessed via the Internet at URL http://www.wavelength-tech.com/Laser-Optics/BeamSplitter.jsp.

* cited by examiner

*Primary Examiner* — Jade R Chwasz (57) ABSTRACT

A display includes a first reflecting surface, a second reflecting surface, and a beam splitter. The second reflecting surface is positioned parallel with respect to the first reflecting surface, and the beam splitter is disposed between the first and second reflecting surfaces. The beam splitter includes a first transmissive substrate having opposed first and second sides and a length extending from a first end to a second end. A first layer of material is disposed on at least one of the first or second sides of the first transmissive substrate. The first layer of reflective material extends from the first end of the first transmissive substrate to a location along the length of the first transmissive substrate.

18 Claims, 7 Drawing Sheets

COLLIMATING DISPLAY AND METHODS

FIELD OF DISCLOSURE

The disclosed system and method are directed to displaying images. More specifically, the disclosed system and method are directed to infinity image displays.

BACKGROUND

Infinity displays are a class of viewing devices capable of displaying images or scenes as if they were set at or approaching, "infinity focus". Such displays are commonly used in aircraft flight simulators recreating aerial vistas at optical infinity, offering the trainee pilot a highly credible panorama. However, the optical components that constitute the prior art tend to be large and very expensive, hence infinity displays tend to be restricted to applications where space is not a significant issue and price gives way to necessity. Furthermore, such conventional infinity displays do not offer autostereoscopic views or motion parallax.

DETAILED DESCRIPTION

This description of the exemplary embodiments is intended to be read in connection with the accompanying drawings, which are to be considered part of the entire written description.

The disclosed systems and methods advantageously provide a display with an improved field-of-view ("FOV") compared to prior art displays. In some embodiments, as described in greater detail below, the improved FOV is achieved through the use of one or more beam splitter disposed between a pair of spaced apart reflecting surfaces. The inclusion of one or more beam splitters increases the distance reflected collimated light is able to travel down a light guide. Further, in some embodiments, the inclusion of one or more beam splitters enables the injection of additional images into the light guide at different angles. The additional images injected into the light guide are combined with the first image via the one or more beam splitter and results in the emission of an image having an improved FOV from the light guide.

Figure 1:
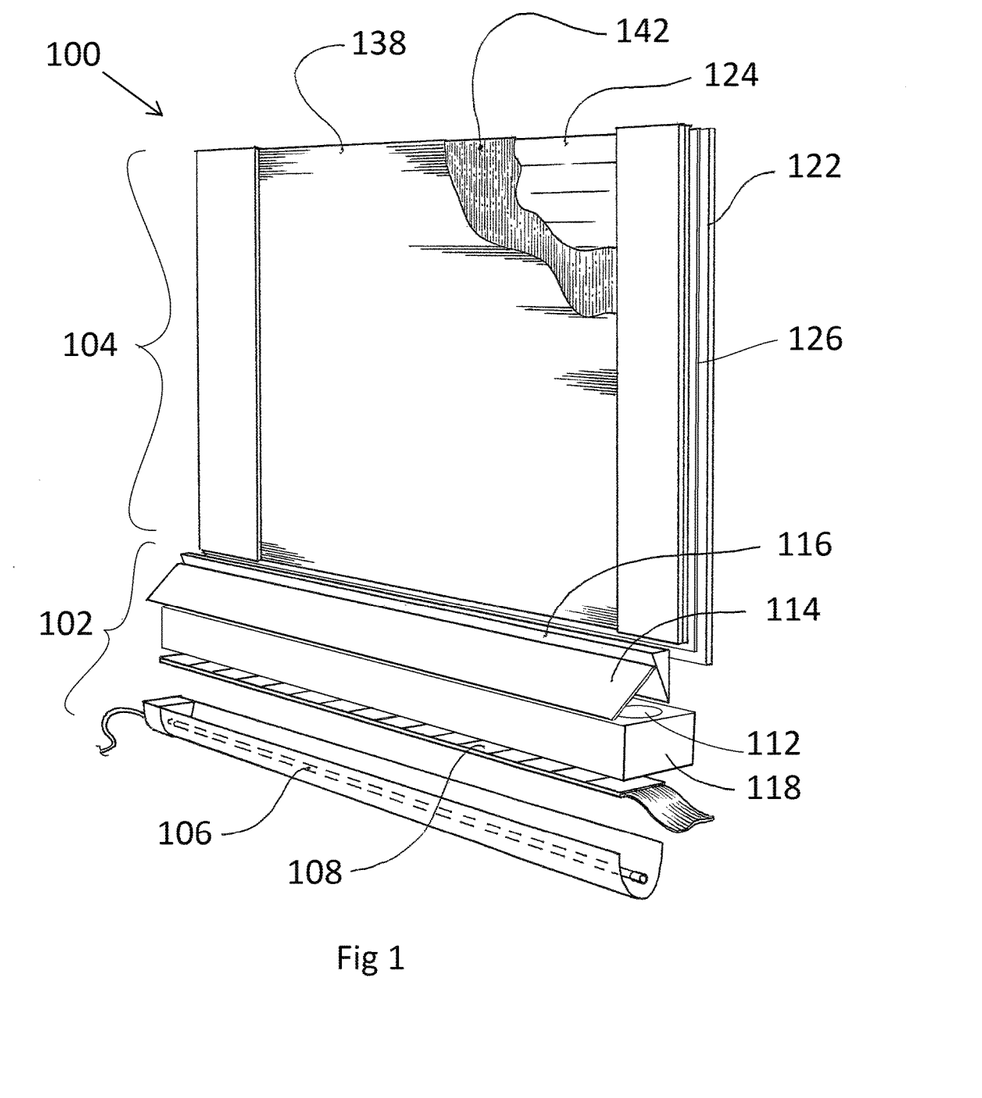
FIG. 1 is a perspective view of one example of an infinity display in accordance with some embodiments.
Figure 2A:
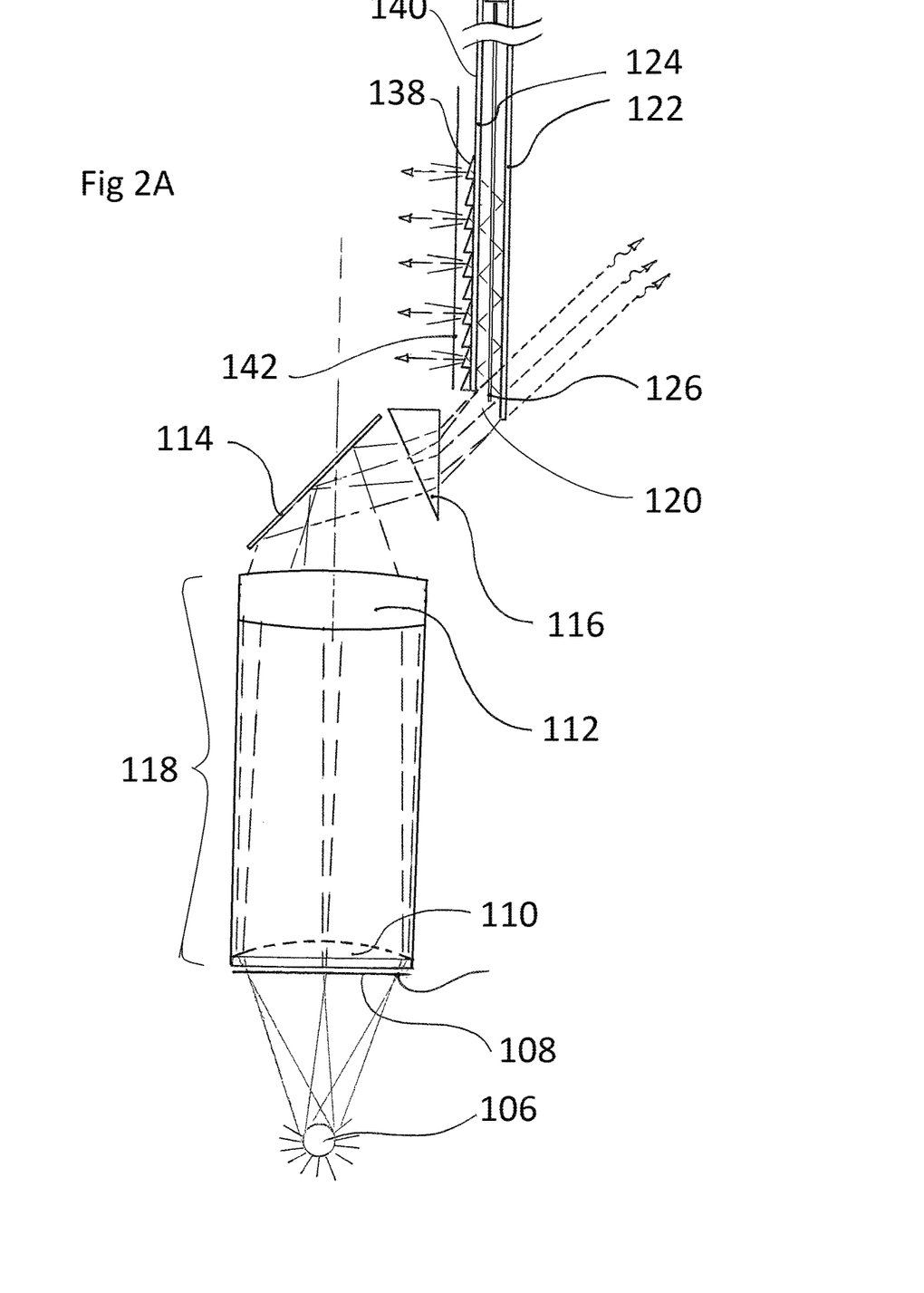
FIG. 2A illustrates one example of the components of an image formation and injection subassembly of the infinity display illustrated in FIG. 1 in accordance with some embodiments.

FIG. 1 illustrates one example of an infinity display 100 in accordance with some embodiments. In some embodiments, display includes an image formation and injection subassembly 102 and a light-guide subassembly 104. Image formation and injection subassembly 102 can include a variety of components including, but not limited to, a light source 106, a spatial light modulator ("SLM") 108, a first lens 110, a second lens 112 that is separate and apart from first lens 110 to form a collimating lens stack 118, a mirror 114, and a prism 116 as illustrated in FIG. 2A.

Light source 106 is configured to provide illumination for the SLM 108. Light source 106 can be any device for providing visible light to SLM 108. In some embodiments, light source 106 is a light emitting diode ("LED") or a cold cathode fluorescent lamp ("CCFL") to list only a couple possibilities. SLM 108 can take a variety of forms and be of a variety of complexities, such as a slide, an electrically addressed spatial light modulator ("EASLM"), or an optically addressed spatial light modulator ("OASLM"), to list only a few possibilities.

SLM 108 is disposed adjacent to lens stack 118, which is configured to collimate light transmitted from light source 106 and that passes through SLM 108. Mirror 114 is positioned adjacent to lens 112 to reflect the light passing through lens 112 towards prism 116. In some embodiments, the reflection and refraction of light via mirror 114 and prism 116 directs chief rays at 45 degrees into entrance pupil 120 while at the same time forcing spectral dispersion as described in U.S. Pat. No. 8,068,285, the entirety of which is incorporated by reference herein. One of ordinary skill in the art will appreciate that although the image generation and injection subassembly is described with reference to FIG. 2 and U.S. Pat. No. 8,068,285, various other image generation and injection subassemblies can be used in accordance with the light guide subassemblies described herein.

One or more collimating lenses 118 are positioned adjacent to or within entrance pupil 120 of light guide 104 and may be part of image generation and injection subassembly 102 or light guide 104. In some embodiments, collimating lenses 118 can be omitted depending on the prior optics included in image generation and injection subassembly 104.

Figure 2B:
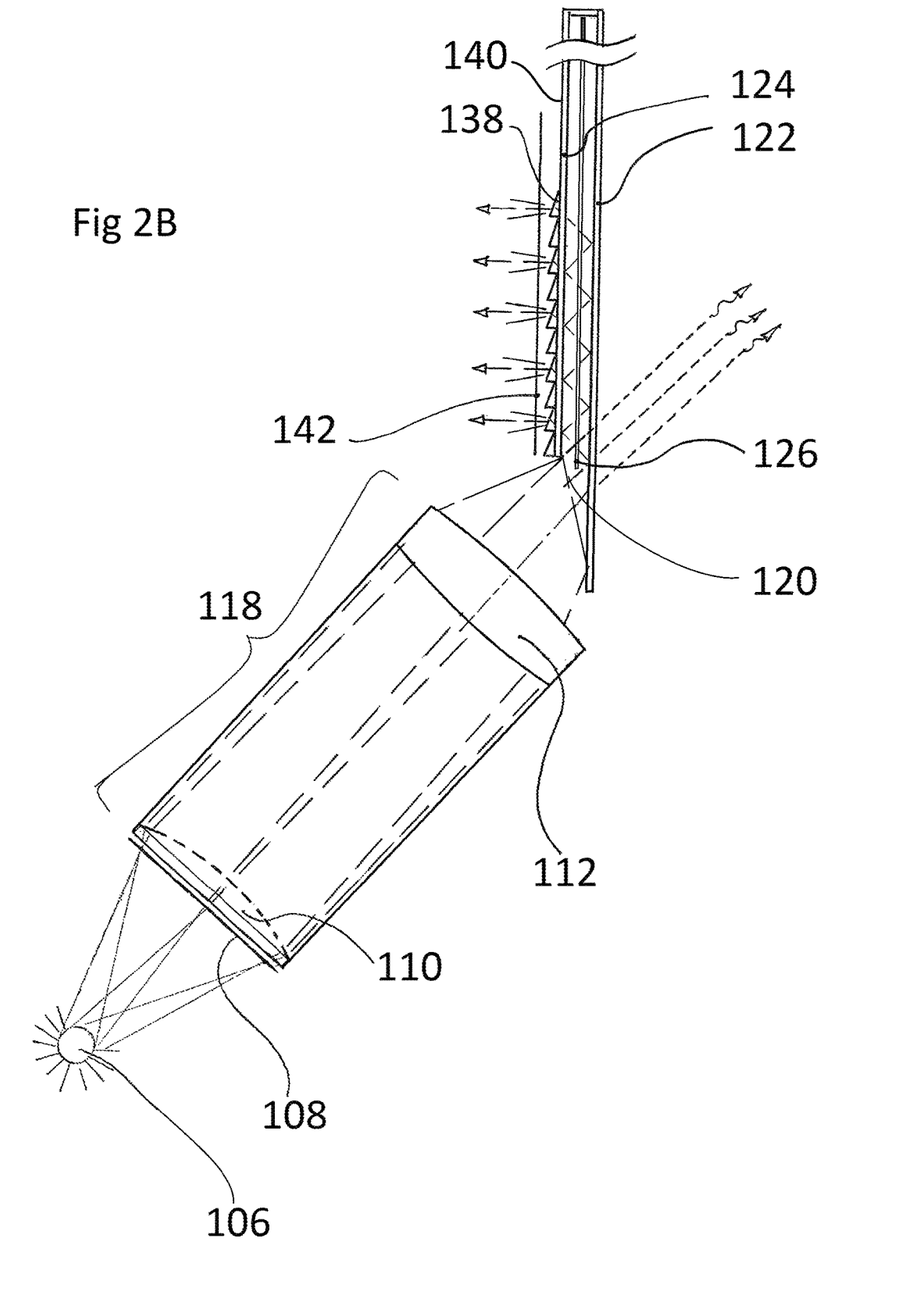
FIG. 2B illustrates another example of the components of an image formation and injection subassembly of the infinity display illustrated in FIG. 1 in accordance with some embodiments.

FIG. 2B illustrates another embodiment of an image formation and injection subassembly 102 and a light-guide subassembly 104. The embodiment of FIG. 2B is similar to the embodiment shown in FIG. 2A except for mirror 114 and prism 116 being omitted. A detailed description of these elements is not repeated.

Figure 3:
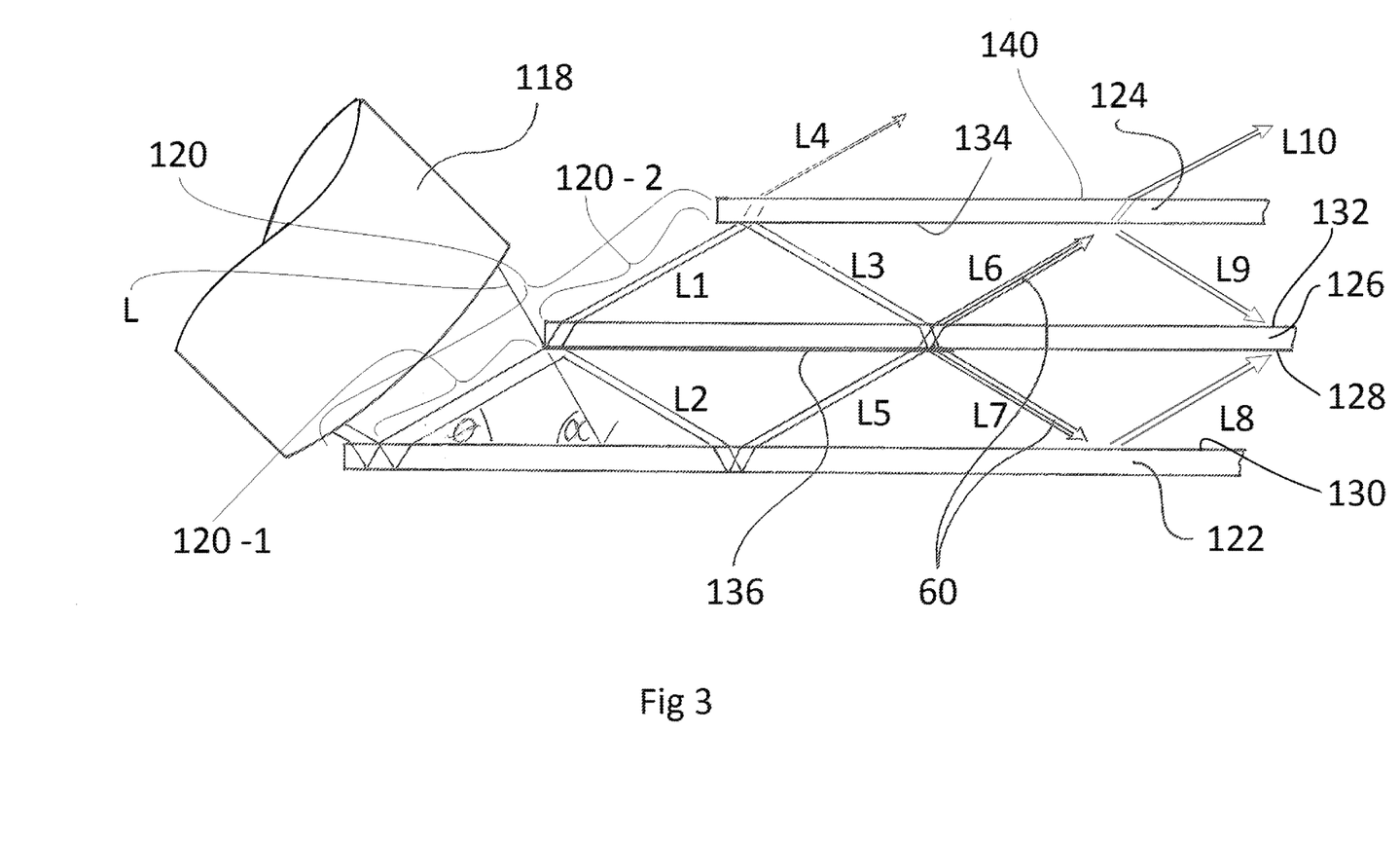
FIG. 3 is a cross-sectional view of one example of a light guide of the infinity display illustrated in FIG. 1 in accordance with some embodiments.

Reference is now made to FIGS. 1 and 3 in which FIG. 3 is a partial cross-sectional view of one example of a light guide in accordance with some embodiments. Light guide 104-1 (FIG. 3) includes a pair of spaced apart reflectors 122 and 124 between which at least one beam splitter 126 is disposed. In some embodiments, reflector 122 is more reflective than reflector 124, which is configured to be at least partially transmissive. For example, in some embodiments, reflector 122 includes a transmissive substrate that is coated with a reflective material, such as Aluminum (Al) or other metallic material, and reflector 124 includes a transmissive substrate that is coated with a less reflective material such as $TiO_2$ or other dielectric material. However, one of ordinary skill in the art will understand that in some embodiments both mirrors 122 and 124 are partially transmissive such that display 100 is a two-sided or two-faced display. An example of a transmissive substrate includes, but is not limited to a glass substrate.

The transmissive substrates of reflectors 122 and 124 can have a variety of different geometries, including rectangular, oval, circular, or geometric shape. In some embodiments, the reflective substrate of reflectors 122 and 124 are spaced apart such that their reflective surfaces, i.e., the surfaces on which reflective materials is disposed, are positioned such that they are approximately parallel to one another. One of ordinary skill in the art will understand that while by being approximately parallel to one another that the reflective surfaces are within a geometric or dimensional tolerance, but may not be exactly parallel to one another.

One of ordinary skill in the art also will understand that the distance between the reflective surfaces of reflectors 122 and 124 can be varied depending upon the application. For example, if the display is a larger free-standing display, reflectors 122 and 124 may be separated from one another by a distance between 10 mm and 30 mm, although greater distances also are contemplated. If the display is a smaller display, such as for a pair of virtual reality glasses, then the reflectors 122, 124 can be separated from one another by a smaller distance, such as between 1 mm and 2 mm.

Beam splitter 126 is disposed approximately equidistant from reflector 122 and reflector 124 such that the rear surface 128 of beam splitter 126 is disposed at nearly the same distance from innermost surface 130 of reflector 122 as the distance between forward surface 132 of beam splitter 126 and innermost surface 134 of reflector 124. In some embodiments, the space between beam splitter 126 and reflectors 122 and 124 is filled with air or other gas. However, in some embodiments, the space between beam splitter 126 and reflectors 122 and 124 is filled with another transmissive material. Beam splitter 126 can have the same or a different geometric arrangement from reflectors 122 and 124. In some embodiments, the opposed surfaces 128, 132 of beam splitter 126 are parallel to the reflective surfaces of reflectors 122 and 124.

Beam splitter 126 includes a coating on at least one of surfaces 128 and 132 that extends at least partially along the length of beam splitter 126. In some embodiments, a layer 136 of a partially transmissive and reflective material is disposed on surface 128 and extends to a distance along the length of beam splitter 126 such that a majority of the acute light rays within the light guide 104, which are received from image generation and injection subassembly 102, transmit through layer 136 at least once. In some embodiments, layer 136 includes a partially reflective material, such as $TiO_2$ or other dielectric material, however one of ordinary skill in the art will understand that other materials can be used. For example, layer 136 can be a metallic material, such as Al, and physically structured to include one or more openings to provide an approximate 50/50 split of reflectance (R) and transmittance (T). In some embodiments, the openings formed in layer 136 take the shape of polka dots; however, one of ordinary skill in the art will understand that openings formed in layer 136 can take a variety of shapes to achieve the desired reflectance/transmittance ratio.

In some embodiments, a Fresnel screen 138 is disposed on outer surface 140 of reflector 124, and an anti-reflection screen 142 is positioned on an outer surface of Fresnel screen 138 as best seen in FIGS. 2A and 2B. Fresnel screen 138 is configured to bend the light being transmitted through Fresnel screen 138 such that the mean light ray exits the Fresnel screen 138 in a direction towards a viewer. In some embodiments, for example, the mean ray exits Fresnel screen 138 in a direction that is approximately normal to a plane defined by reflector 124. However, one of ordinary skill in the art will understand that Fresnel screen 138 can be arranged to direct the mean light ray in a number of directions that are greater or less than 90 degrees relative to a plane defined by reflector 124.

The inclusion of beam splitter 126 between reflectors 122 and 124 enables the distance between reflectors 122 and 124 to be increased compared to conventional light guides without causing shadow zones in the projected image (i.e., the light transmitted through reflector 124 and, in some embodiments, Fresnel screen 138). As described in greater detail below, beam splitter 126 expands the light as it the light reflects off of beam splitter 126 effectively "filling in" gaps (i.e., shadow zones) that would otherwise be present had beam splitter 126 not be present between the parallel surfaces of reflectors 122 and 124.

For example, FIG. 3 shows a collimating lens stack 118 as injecting light rays L into a first aperture 120-1, which is half of the total aperture 120 of defined between reflector 122 and reflector 124. As shown in FIG. 3, aperture 120-1 is located between reflector 122 and beam splitter 126, and another aperture 120-2 is located between reflector 124 and beam splitter 126. The light rays injected into aperture 120-1 are reflected off of reflector 122, which as described above has a near 100% reflection. The light rays L reflected off of reflector 122 travel at an angle towards beam splitter 126 and engage layer 136 formed on surface 128 of beam splitter 126. Layer 136 is configured to pass through approximately 50 percent of the incident light rays and to reflect the remaining incident light rays.

The light rays L1 that pass through beam splitter 126 continue propagating towards reflector 124, and the light rays L2 reflected by beam splitter 126 propagate back towards reflector 122. Partially transmissive reflector 124 reflects a majority of light rays L1 that propagate back towards beam splitter as light rays L3 and passes the remainder of light rays that are emitted to Fresnel screen 138 and, in some embodiments, anti-reflective screen 142 as light rays L4. Light rays L2, which are reflected by beam splitter 126, propagate back towards reflective reflector 122 where they are again reflected back towards beam splitter 126 as light rays L5.

Light rays L3 and L5 propagate back towards beam splitter 126 where they are divided and combined by layer 136. For example, a portion of light rays L3 pass through beam splitter 126 and are combined with a portion of light rays L5 that are reflected by beam splitter 126 where they then propagate between reflector 122 and beam splitter 126 as light rays L7. A portion of light rays L5 pass through beam splitter 126 and are combined with a portion of light rays L3 that are reflected by beam splitter 126 and these combined light rays L6 propagate between reflector 124 and beam splitter 126 towards reflector 124.

Light rays L6 will be reflected partially off of reflector 124 with a portion of the light rays L6 being transmitted through partially transmissive reflector 124, Fresnel screen 138, and, in some embodiments, anti-reflective screen 142 such that they are visible to a person viewing display 100. The light rays of light rays L6 that are reflected by partially transmissive reflector 124 (not shown in FIG. 3), will propagate back toward beam splitter 126 at a location beyond layer 136. In a similar manner, light rays L7 are reflected off of highly-reflective reflector 122 back towards beam splitter 126 at a location that is beyond an innermost end of layer 136. Because the reflected rays L6 and L7 travel towards beam splitter 126 beyond the innermost end of layer 136, these light rays pass through beam splitter 126 without being reflected as beam splitter 126 at this location is a highly transmissive material, such as glass. From this point on, the rays of light propagating between reflectors 122, 124, i.e., light rays L8 and L9, propagate much in the same way as the light rays propagate between mirrors 3 and 4 as described in U.S. Pat. No. 8,068,285. However, due to the presence of beam splitter 126, the light rays L8 and L9 traveling between reflectors 122 and 124 have been expanded such that dark or shadow regions along the light guide, which result in uncoupling of alight along the light guide, are substantially reduced or eliminated.

In some embodiments, multiple beam splitters and lenses can be used in a single light guide. For example, FIGS. 4A and 4B illustrate examples of light-guide subassemblies 204A, 204B including more than a single beam splitter in accordance with some embodiments.

Figure 4A:
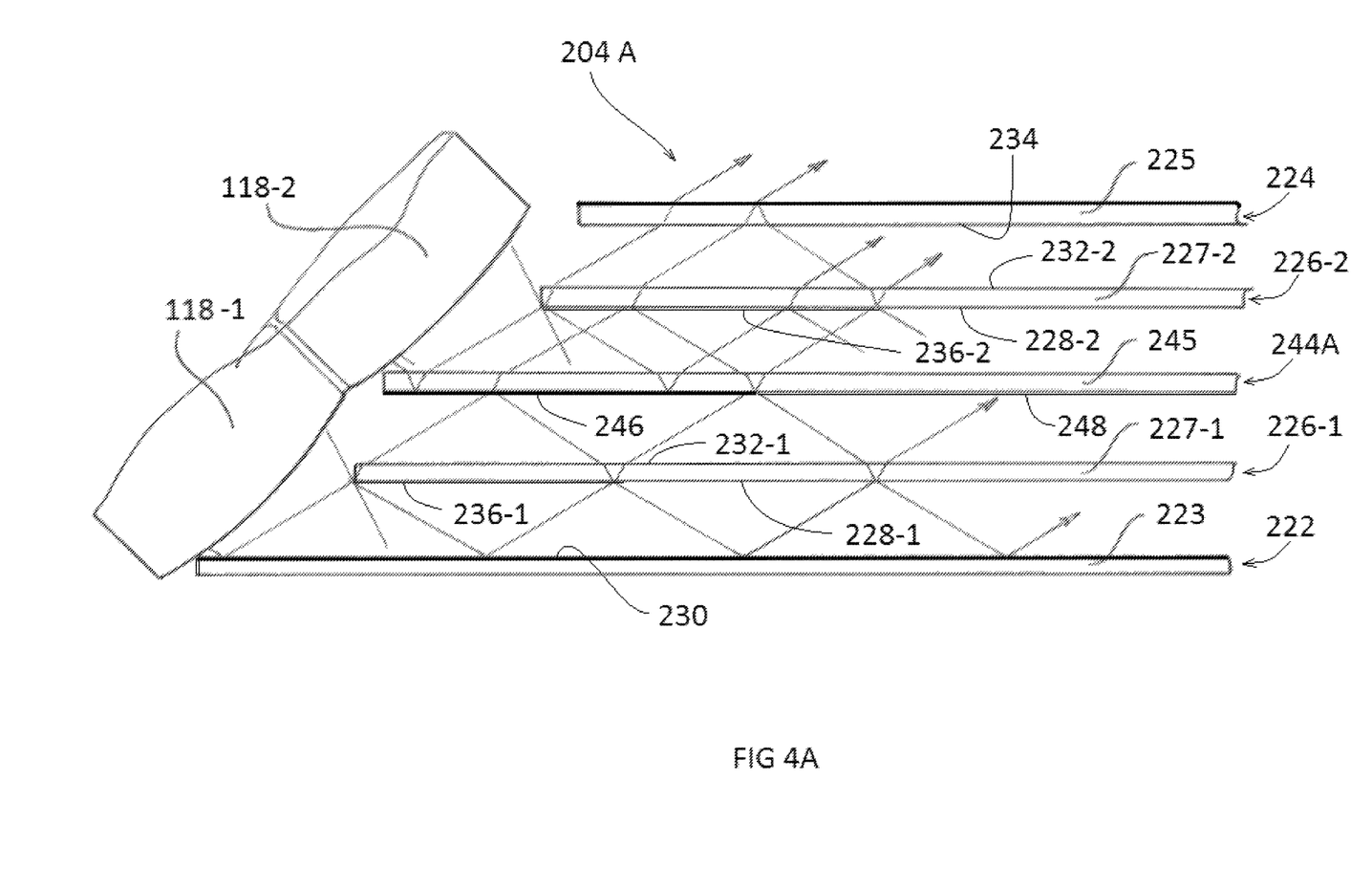
FIG. 4A illustrates one example of a light guide including a plurality of beam splitters in accordance with some embodiments.
Figure 4B:
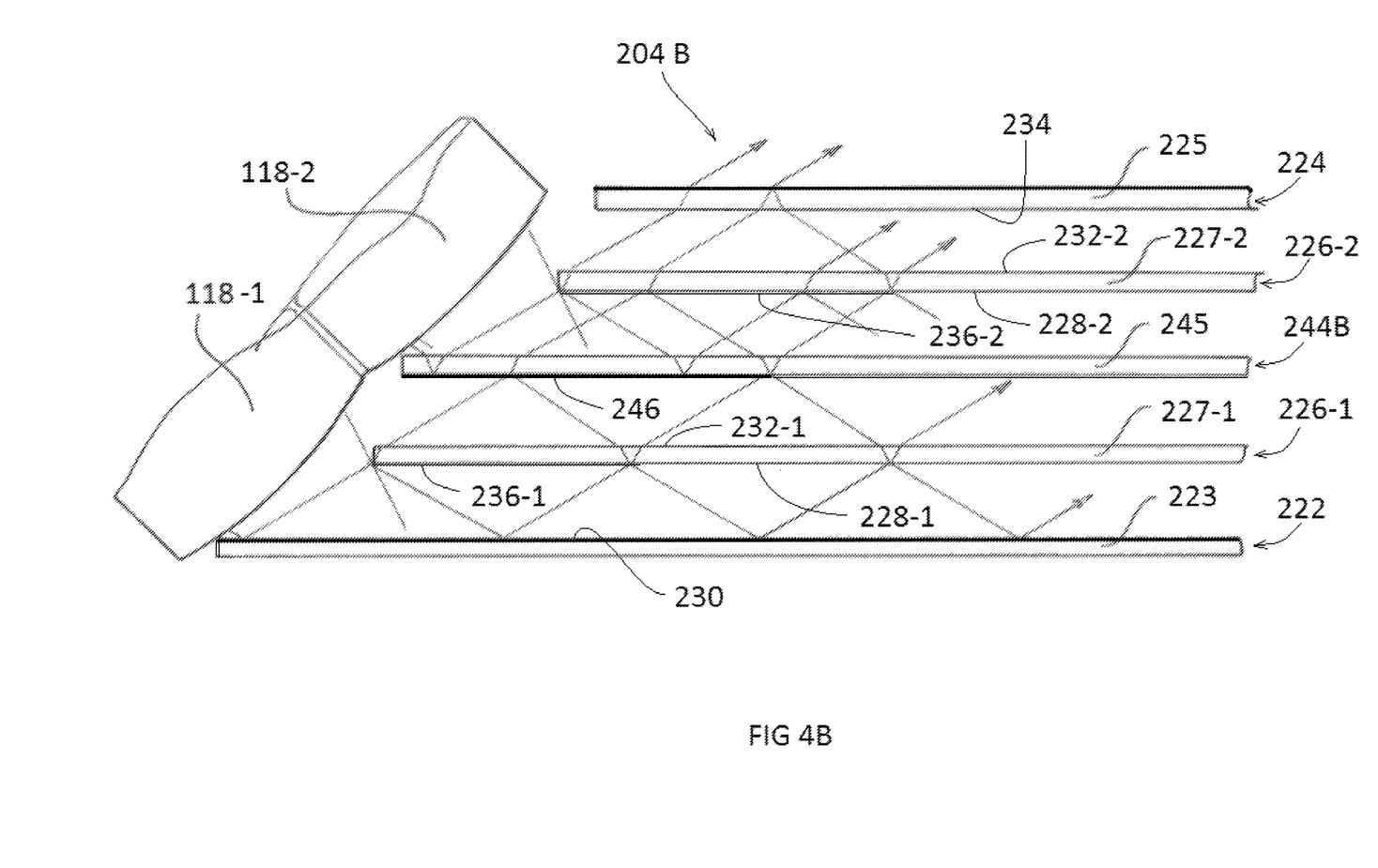
FIG. 4B illustrates another example of a light guide including a plurality of beam splitters in accordance with some embodiments.

Referring first to FIG. 4A, subassembly 204A includes a pair of spaced apart reflectors 222, 224 between which beam splitters 226-1, 226-2 (collectively "beam splitters 226") are disposed. A third reflector 244A is disposed between beam splitters 226 as described in greater detail below. A pair of lens collimating lens stacks 118-1, 118-2 (collectively "collimating lenses" or "lens stacks 118") are positioned to inject light into a respective apertures 220-1, 220-2 ("apertures 220") positioned above and below reflector 244.

Reflector 222 includes a transmissive substrate 223, such as glass, on which at least one reflective coating is disposed on a surface thereof. In some embodiments, the reflective coating is disposed on an inner surface 230 of substrate 222 and includes a highly reflective material, such as Al or other material having a reflectance at or approaching 100%. One of ordinary skill in the art will understand that the layer of reflective material disposed on inner surface 230 can have less reflectance such that reflector 222 reflects and transmits light to provide for a two-faced display.

Reflector 224 also includes a transmissive substrate 225 on which a less-reflective (e.g., partially transmissive/partially reflective) material, such as $TiO_2$, is disposed. The layer of the partially transmissive/partially reflective material is disposed on an inner surface 234 of substrate 225. Although not shown in FIGS. 4A and 4B, a Fresnel screen and an anti-reflective screen can be disposed on an outer surface of substrate 225.

Beam splitters 226 include a substrate 227 (i.e., substrates 227-1, 227-2) including a layer 236 (i.e., layers 236-1, 236-2) of a partially transmissive and partially reflective material disposed on at least one of surfaces 228-1, 228-2, 232-1, 232-2. In some embodiments, layers 236 extend from a first end of substrates 227 to a distance along the length of the substrates 227 such that a majority of the acute light rays within the light guide 204 pass through said layers at least once. Layers 236 can be a partially reflective material, such as $TiO_2$ or other metallic or dielectric material. In some embodiments, layers 236 can be physically structured to include one or more openings to provide an approximate 50/50 split of reflectance (R) and transmittance (T).

Reflector 244 is positioned between beam splitters 226 and includes a substrate 245 having at least one layer of an at least partially reflective material positioned on at least one side thereof For example, in some embodiments substrate 245 includes a first material having a first reflectivity coating a first portion of a first side and a second material having a second reflectivity coating a second portion of the first side. More particularly, and as illustrated in FIG. 4A, a highly reflective material 246, such as Al, is formed over a first portion of substrate 244 and a less reflective material 248, such as $TiO_2$, is formed over a second portion of substrate 244.

In some embodiments, substrate 245 includes a single material, such as a highly reflective or partially reflective material, formed over at least a portion of a side of substrate 245. For example and referring now to FIG. 4B, a single material 248 is formed over at least a portion of substrate 245 that extends between beam splitters 226.

The operation of light guides 204A, 204B shown in FIGS. 4A, 4B, respectively, are similar to the operation of light guide 104 described above. For example, beam splitters 226 divide light rays as they propagate along the length of the light guides 204A, 204B. The inclusion of a reflector 244 between beam splitters 226 and the utilization of a plurality of collimated lens stacks 118 enables the light injected by collimated lens stacks 118 to be reflected internally at least one time, which expands the beam. The expanded beam "fills" the gaps or shadow zones that would otherwise be present along light guides 204A, 204B. One of ordinary skill in the art will understand light guides having a plurality of beam splitters can have other arrangements.

Figures 5A, 5B:
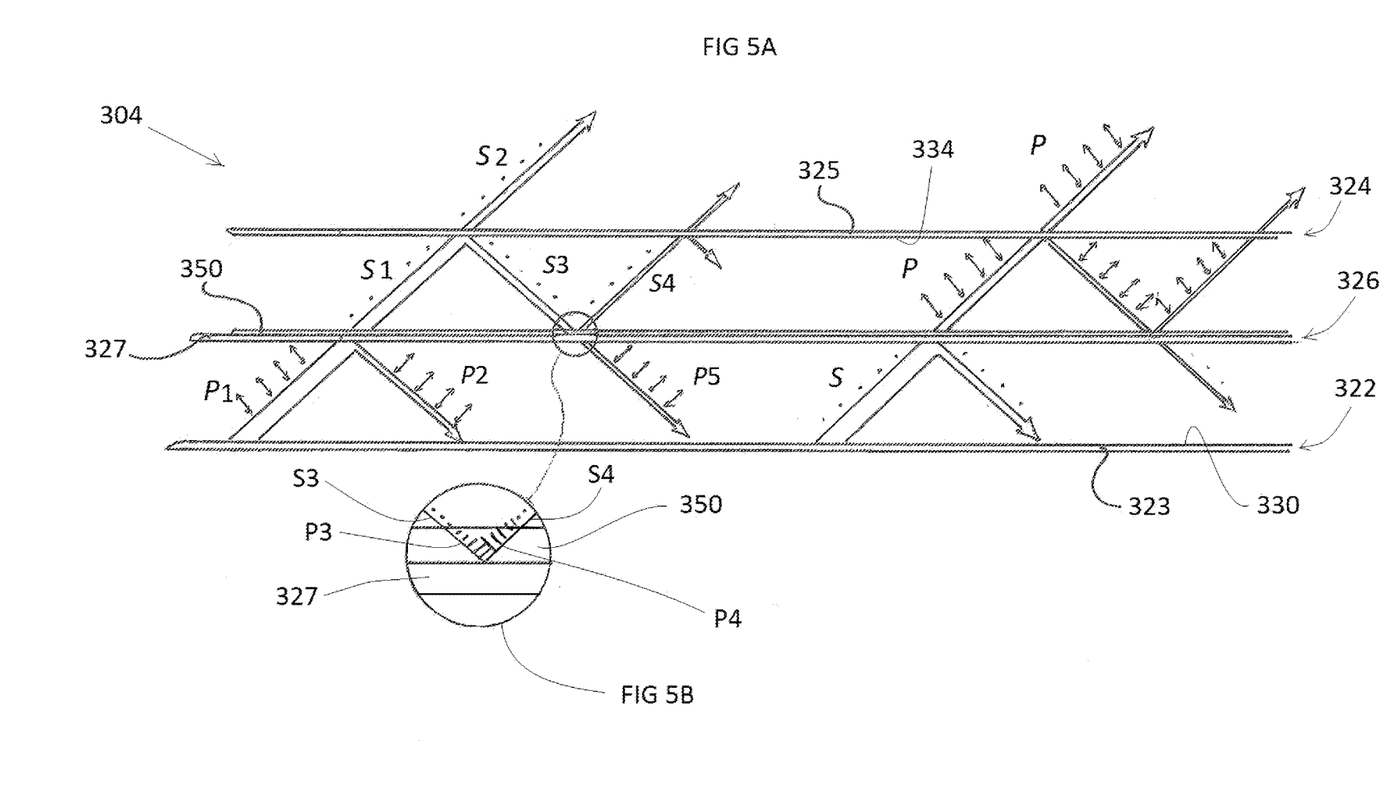
FIG. 5A illustrates one example of a light guide configured with a beam splitter including a wave retarder in accordance with some embodiments.
FIG. 5B is a detail view of light engaging the beam splitter illustrated in FIG. 5A in accordance with some embodiments.

In addition to dividing light using reflectance and transmittance, light can be divided using polarization. For example, FIG. 5 illustrates one example of a light guide 304 including a wave retarder for polarizing light in accordance with some embodiments.

Light guide 304 includes a pair of spaced apart reflectors 322 and 324 between which at least one beam splitter 326 is positioned. Reflector 322 includes a transmissive substrate 323 having an inner surface 330 upon which at least one reflective coating is disposed. In some embodiments, transmissive substrate 323 is a glass substrate and the reflective coating is at least one of a highly reflective metal, such as Al, or is partially reflective dielectric material, such as $TiO_2$. Reflector 324 also includes a transmissive substrate 325 including an inner surface 334 upon which a reflective material is disposed. In some embodiments, the reflective material is a partially reflective material such as $TiO_2$; however, one of ordinary skill in the art will understand that other types of reflective materials can be disposed on a surface of substrate 325.

Beam splitter 326 includes a transmissive substrate 327 including at least one surface having a reflective material disposed on at least one surface thereof and to which a wave retarder 350 is coupled. In some embodiments, the reflective material disposed on substrate 327 is a reflective dielectric material, such as $TiO_2$, and wave retarder 350 is a ½ wave retarder, although one of ordinary skill in the art will understand that other reflective materials and wave retarders can be used. For example, in some embodiments two ¼ wave retarders can be implemented instead of a single ½ wave retarder.

Wave retarder 350 is configured to rotate the light passing through substrate 327 and wave retarder 350 from a first polarization state to a second polarization state. For example, if light is propagating such that the electric field is parallel to the plane of incidence, i.e., a "P" polarized state, then wave retarder 350 rotates the light such that the electric field is perpendicular to the plane of incidence, i.e., an "S" polarized state. When light is in a P state, the light is more likely to be transmitted through a substrate. Conversely, when light is in the S state, the light is more likely to be reflected by a substrate. Therefore, light in the P state is more likely to uncouple from a light guide, such as light guide 304, than light in the S state.

The operation of light guide 304 is now described with reference to FIG. 5. Light, either polarized or unpolarized, is injected into an aperture defined between at least one of reflectors 322, 324 and beam splitter 326, such as aperture 320 defined between reflector 322 and beam splitter 326. In the embodiment illustrated in FIGS. 5A and 5B, P-state light P1 propagates away from reflector 322 towards beam splitter 326. Light passing through beam splitter 326 is rotated to provide light in an S state, i.e., S1 light, and light reflected by beam splitter 326 remains in the P state and propagates back towards reflector 322 as light P2.

The S1 light propagates toward reflector 324, which transmits a portion of the light as S2 and reflects the other portion of light as S3. In some embodiments, light S2, which is uncoupled from light guide 304, passes through a Fresnel screen (not shown in FIG. 5A) and an anti-reflection screen (also not shown in FIG. 5A). Light S3 propagates away from reflector 324 towards beam splitter 326, which is configured to rotate light passing through wave retarder 350 and to reflect a portion of the incident light back towards reflector 324. For example and as best seen in FIG. 5B, the S3 light is rotated by wave guide 350 thereby providing light P3. A portion of the P3 light is reflected off of substrate 327 and propagates back toward reflector 324 as light P4. Wave retarder 350 rotates light P4, which emerges from wave retarder 350 as light S4 propagating towards reflector 324. A portion of light P4 is transmitted through substrate 327 and propagates toward reflector 322 as light P5. In this manner, light continues to propagate along wave guide 304 being reflected and transmitted through beam splitter 326 and reflectors 322, 324.

The use of a wave retarder advantageously enables the properties of P-state and S-state light to be utilized in order to distribute the light evenly along a wave guide. Although only a single beam splitter configured with a wave retarder is shown in FIGS. 5A and 5B, one of ordinary skill in the art will understand that multiple beam splitters can be implemented between the outer-most mirrors of the display in a similar manner as the multiple beam splitters shown in FIGS. 4A and 4B.

The disclosed systems and methods advantageously provide for larger displays and display with improved FOVs compared to conventional displays. In some embodiments, the improved FOV is achieved by including one or more beam splitters between a pair of spaced apart mirrors. In some embodiments, the improved FOV is achieved by the combination of one or more beam splitters and injecting light into the light guide using multiple lens stacks. The light injected by multiple lens stacks can be injected parallel to one another or at divergent angles relative to one another.

In some embodiments, a display includes a first reflecting surface, a second reflecting surface, and a beam splitter. The second reflecting surface is positioned parallel with respect to the first reflecting surface, and the beam splitter is disposed between the first and second reflecting surfaces. The beam splitter includes a first transmissive substrate having opposed first and second sides and a length extending from a first end to a second end. A first layer of material is disposed on at least one of the first or second sides of the first transmissive substrate. The first layer of reflective material extends from the first end of the first transmissive substrate to a location along the length of the first transmissive substrate.

In some embodiments, the first layer of material includes a reflective material.

In some embodiments, the first layer of material includes a polarizing material.

In some embodiments, the first reflecting surface is disposed on an inner side of a second transmissive substrate. The second reflecting surface is disposed on an inner side of a third transmissive substrate.

In some embodiments, a Fresnel screen is disposed on an outer side of the second transmissive substrate.

In some embodiments, the second reflecting surface is more reflective than the first reflecting surface.

In some embodiments, a third reflective surface is disposed between the first reflective surface and the beam splitter. A second beam splitter is disposed between the first reflective surface and the third reflective surface. The second beam splitter includes a second transmissive substrate having opposed first and second sides and a length extending from a first end to a second end. A second layer of material is disposed on at least one of the first or second sides of the second transmissive substrate. The second layer of reflective material extends from the first end of the second transmissive substrate to a location along the length of the second transmissive substrate.

In some embodiments, the second layer of material includes one of a reflective material or a polarizing material.

In some embodiments, a display includes a light guide and a lens stack disposed adjacent to the light guide. The light guide includes a first reflecting surface, a second reflecting surface, and a beam splitter. The second reflecting surface is disposed parallel to the first reflecting surface, and the beam splitter is disposed between the first reflecting surface and the second reflecting surface. The beam splitter includes a first transmissive substrate having opposed first and second sides and a length extending from a first end to a second end. A first layer of material is disposed on at least one of the first or second sides of the first transmissive substrate. The first layer of material extending from the first end of the first transmissive substrate to a location along the length of the first transmissive substrate. The lens stack is configured to collimate light into an aperture disposed between the beam splitter and the second reflecting surface.

In some embodiments, the first layer of material includes at least one of a reflective material and a polarizing material.

In some embodiments, the first reflecting surface is disposed on an inner side of a second transmissive substrate. The second reflecting surface is disposed on an inner side of a third transmissive substrate.

In some embodiments, a Fresnel screen is disposed on an outer side of the second transmissive substrate.

In some embodiments, the second reflecting surface is more reflective than the first reflecting surface.

In some embodiments, a third reflective surface is disposed between the first reflective surface and the first beam splitter. A second beam splitter is disposed between the first reflective surface and the third reflective surface. The second beam splitter includes a second transmissive substrate having opposed first and second sides and a length extending from a first end to a second end. A second layer of material is disposed on at least one of the first or second sides of the second transmissive substrate and extends from the first end of the second transmissive substrate to a location along the length of the second transmissive substrate.

In some embodiments, the second layer of material includes at least one of a reflective material or a polarizing material.

In some embodiments, a second lens stack is disposed adjacent to the light guide. The lens stack is configured to collimate light into an aperture disposed between the second beam splitter and at least one of the first reflecting surface or the third reflecting surface.

In some embodiments, a method includes receiving collimated light in an aperture defined by a first reflecting surface and a beam splitter, and the collimated light is divided into first and second portion by the beam splitter. The dividing includes reflecting the first portion of the collimated light such that the first portion of the collimated light travels towards a first reflective surface, and transmitting the second portion of the collimated light such that the second portion of the collimated light travels towards a second reflective surface that is positioned parallel to the first reflective surface.

In some embodiments, at least a portion of the second portion of the collimated light is transmitted through the second reflective surface.

In some embodiments, the portion of the second portion of the collimated light is bent through a Fresnel screen such that the portion of the second portion of the collimated light travels in a perpendicular direction relative to a plane defined by the first reflecting surface.

The disclosed systems and methods advantageously provide for larger displays and display with improved FOVs compared to conventional displays. In some embodiments, the improved FOV is achieved by including one or more beam splitters between a pair of spaced apart mirrors. In some embodiments, the improved FOV is achieved by the combination of one or more beam splitters and injecting light into the light guide using multiple lens stacks. The light injected by multiple lens stacks can be injected parallel to one another or at divergent angles relative to one another.

Although the disclosed systems and methods have been described in terms of exemplary embodiments, they are not limited thereto. Rather, the appended claims should be construed broadly, to include other variants and embodiments of the disclosed systems and methods, which may be made by those skilled in the art without departing from the scope and range of equivalents of the systems and methods.

What is claimed is:

1. A display, comprising:
a first reflecting surface;
a second reflective surface positioned parallel with respect to the first reflecting surface; and
a beam splitter disposed between and parallel with the first reflecting surface and the second reflecting surface, the beam splitter including
a first transmissive substrate having opposed first and second sides and a length extending from a first end to a second end, and
a first layer of material disposed on at least one of the first or second sides of the first transmissive substrate, the first layer of material extending from the first end of the first transmissive substrate to a location along the length of the first transmissive substrate;
a third reflective surface disposed between the first reflective surface and the first beam splitter; and
a second beam splitter disposed between the first reflective surface and the third reflective surface, the second beam splitter including
a second transmissive substrate having opposed first and second sides and a length extending from a first end to a second end, and
a second layer of material disposed on at least one of the first or second sides of the second transmissive substrate, the second layer of reflective material extending from the first end of the second transmissive substrate to a location along the length of the second transmissive substrate,
wherein the second layer of material includes a polarizing material.

2. The display of claim 1, wherein the first layer of material includes a reflective material.

3. The display of claim 1, wherein the first layer of material includes a polarizing material.

4. The display of claim 1, wherein the first reflecting surface is disposed on an inner side of a second transmissive substrate, and the second reflecting surface is disposed on an inner side of a third transmissive substrate.

5. The display of claim 4, further comprising a Fresnel screen disposed on an outer side of the second transmissive substrate.

6. The display of claim 1, wherein the second reflecting surface is more reflective than the first reflecting surface.

7. The display of claim 1, wherein the second layer of material includes a reflective material.

8. A method performed by the display of claim 1, the method comprising:
receiving collimated light in an aperture defined between the first reflecting surface and the second reflecting surface;
dividing the collimated light into a first portion and a second portion by the first beam splitter, wherein dividing the collimated light includes
reflecting the first portion of the collimated light such that the first portion of the collimated light travels towards the first reflecting surface, and
transmitting the second portion of the collimated light such that the second portion of the collimated light travels towards the second beam splitter.

9. The method of claim 8, further comprising transmitting at least a portion of the second portion of the collimated light through the second reflective surface.

10. The method of claim 9, further comprising bending the portion of the second portion of the collimated light through a Fresnel screen such that the portion of the second portion of the collimated light travels in a perpendicular direction relative to a plane defined by the first reflecting surface.

11. A display, comprising:
a light guide including
a first reflecting surface;
a second reflecting surface disposed parallel to the first reflecting surface; and
a beam splitter disposed between and parallel with the first reflecting surface and the second reflecting surface, the beam splitter including
a first transmissive substrate having opposed first and second sides and a length extending from a first end to a second end, and
a first layer of material disposed on at least one of the first or second sides of the first transmissive substrate, the first layer of material extending from the first end of the first transmissive substrate to a location along the length of the first transmissive substrate;
a third reflective surface disposed between and parallel with the first reflective surface and the first beam splitter;
a second beam splitter disposed between and parallel with the first reflective surface and the third reflective surface, the second beam splitter including
a second transmissive substrate having opposed first and second sides and a length extending from a first end to a second end, and a second layer of material disposed on at least one of the first or second sides of the second transmissive substrate, the second layer of reflective material extending from the first end of the second transmissive substrate to a location along the length of the second transmissive substrate; and a lens stack disposed adjacent to the light guide, the lens stack configured to collimate light into an aperture disposed between the beam splitter and the second reflecting surface, wherein the second layer of material includes a polarizing material.

12. The display of claim 11, wherein the first layer of material includes a reflective material.

13. The display of claim 11, wherein the first layer of material includes a polarizing material.

14. The display of claim 11, wherein the first reflecting surface is disposed on an inner side of a second transmissive substrate, and the second reflecting surface is disposed on an inner side of a third transmissive substrate.

15. The display of claim 14, further comprising a Fresnel screen disposed on an outer side of the second transmissive substrate.

16. The display of claim 11, wherein the second reflecting surface is more reflective than the first reflecting surface.

17. The display of claim 11, wherein the second layer of material includes a reflective material.

18. The display of claim 11, further comprising a second lens stack disposed adjacent to the light guide, the lens stack configured to collimate light into an aperture disposed between the second beam splitter and at least one of the first reflecting surface or the third reflecting surface.

\* \* \* \* \*